US009800570B1

(12) United States Patent
Bleisch

(10) Patent No.: US 9,800,570 B1
(45) Date of Patent: Oct. 24, 2017

(54) METHOD OF PERSISTENT AUTHENTICATION WITH DISABLEMENT UPON REMOVAL OF A WEARABLE DEVICE

(71) Applicant: ADT US HOLDINGS, INC., Boca Raton, FL (US)

(72) Inventor: N. David Bleisch, Delray Beach, FL (US)

(73) Assignee: ADT US HOLDINGS, INC., Boca Raton, FL (US)

( * ) Notice: Subject to any disclaimer, the term of this patent is extended or adjusted under 35 U.S.C. 154(b) by 31 days.

(21) Appl. No.: 14/867,704

(22) Filed: Sep. 28, 2015

Related U.S. Application Data

(60) Provisional application No. 62/056,002, filed on Sep. 26, 2014.

(51) Int. Cl.
*G06F 7/04* (2006.01)
*H04L 29/06* (2006.01)

(52) U.S. Cl.
CPC .......... *H04L 63/083* (2013.01); *H04L 63/102* (2013.01)

(58) Field of Classification Search
CPC .......................... H04L 63/083; H04L 63/102
See application file for complete search history.

(56) References Cited

U.S. PATENT DOCUMENTS

| 6,057,764 | A | 5/2000 | Williams |
| 6,801,140 | B2 | 10/2004 | Mäntyjärvi et al. |
| 9,230,430 | B2 * | 1/2016 | Civelli .................. G08C 23/04 |
| 9,398,007 | B1 * | 7/2016 | Wegener ............... H04W 12/06 |
| 9,641,526 | B1 * | 5/2017 | Gopalakrishnan .. H04L 63/0876 |
| 2002/0019584 | A1 * | 2/2002 | Schulze .............. G06F 19/3418 600/300 |
| 2005/0275714 | A1 | 12/2005 | Ishikawa et al. |
| 2008/0200774 | A1 * | 8/2008 | Luo ....................... A61B 5/0002 600/301 |
| 2008/0216171 | A1 * | 9/2008 | Sano ......................... H04L 9/32 726/19 |
| 2008/0238667 | A1 | 10/2008 | Olson |
| 2008/0266118 | A1 * | 10/2008 | Pierson ................ A61B 5/0205 340/573.6 |
| 2014/0139486 | A1 | 5/2014 | Mistry et al. |
| 2015/0145673 | A1 * | 5/2015 | Choi .................... A61B 5/6843 340/539.12 |
| 2015/0261946 | A1 * | 9/2015 | Yoon ....................... G06F 21/34 726/19 |
| 2015/0264045 | A1 * | 9/2015 | Blondeau ............... G06F 21/31 726/5 |

(Continued)

FOREIGN PATENT DOCUMENTS

WO 2015011552 A1 1/2015

*Primary Examiner* — Techane Gergiso
(74) *Attorney, Agent, or Firm* — Christopher & Weisberg, P.A.

(57) ABSTRACT

The invention relates to a method and wearable device for persistent authentication using the wearable device. The wearable device is activated in response to an enablement indication, the enablement indication being generated in response to a physical change in the wearable device. A permission is granted in response to authorization data. The wearable device is deactivated in response to a disablement indication, the disablement indication being generated in response to a physical change in the wearable device. The permission may also be revoked.

19 Claims, 4 Drawing Sheets

(56) References Cited

U.S. PATENT DOCUMENTS

2015/0294306 A1* 10/2015 Grigg ................ G06Q 20/3821
    705/67
2015/0381609 A1* 12/2015 Dadu ................ H04L 63/0861
    726/9

* cited by examiner

METHOD OF PERSISTENT AUTHENTICATION WITH DISABLEMENT UPON REMOVAL OF A WEARABLE DEVICE

CROSS-REFERENCE TO RELATED APPLICATION

This application is related to and claims priority to U.S. Provisional Patent Application Ser. No. 62/056,002, filed Sep. 26, 2014, entitled METHOD OF PERSISTENT AUTHENTICATION WITH DISABLEMENT UPON REMOVAL OF A WEARABLE DEVICE, the entirety of which is incorporated herein by reference.

STATEMENT REGARDING FEDERALLY SPONSORED RESEARCH OR DEVELOPMENT n/a

TECHNICAL FIELD

The present invention relates to a method and system for user authentication, and in particular employing a wearable device configured to provide persistent authentication in alarm monitoring systems.

BACKGROUND

It is common for businesses and homeowners to have an electronic system for detecting alarm event conditions (such as intrusion, fire, carbon monoxide, flooding, temperature conditions, appliance status, etc.) at their premises, which reports the event to a server or other system that notifies the user who can monitor the systems through their phone, personal digital assistant (PDA), etc., and/or remotely interact and control systems at their premises (such as lighting, thermostats, energy management devices, security systems, etc.). These systems may also provide alarm event information to a monitoring center that can contact first responders on the user's behalf, typically over a conventional phone line, and more recently over cellular and broadband networks. Such electronic systems may be capable of switching between armed and disarmed states, determining which types of events, if any, may trigger an alarm event based on the state of the system. Arming and disarming are often done through a user interface, such as a proximity card reader, keypad, touchscreen, smartphone or internet application. Such systems may also allow for entry through a doorway without generating an alarm event while a system is in an armed state if a user provides an authentication code just prior to or immediately following use of a doorway.

Often such systems may require a manual interaction between an alarm monitoring system user and an alarm monitoring system interface to arm or disarm a system. Interaction may require entry of an authentication code on a keypad located inside a structure within a certain time of entering through a door that has a sensor capable of registering an alarm event upon opening and/or closing. Alternatively, a system interface, such as a proximity card reader, may allow a user to arm or disarm a system prior to entering and/or exiting a premises with an authentication code.

Additionally, individuals constantly use various items as proxies for permission or authorization tokens to perform certain actions—keys or fobs to unlock doors and start cars, personal identification numbers (PINS) to use automated teller machines (ATMs) or disarm electronic alarm systems, ID badges to open access controlled areas at work, driver's licenses to validate authorization to use credit cards, etc. This often requires individuals to carry several of these items (keys, fobs, access badges, etc.) with them at the same time. Additionally, these devices are prone to loss or theft and can provide the person possessing them with the same permissions as the rightful owner (e.g. an access control card, even though it may have a photo of the rightful owner on it, can still usually be used by anyone possessing it to access otherwise restricted areas).

It is known in the art that permissions in the form of authentication codes, proxies or authorization tokens may be stored for use with portable or wearable devices, including cell phones, smart wearable devices, or jewelry. Storing permissions in such devices allows for consolidation of authentication codes within a single device which may simplify and add convenience to procedures or transactions which require authentication. For example, a user may store permissions for use with an alarm monitoring system, a vehicle, and bank accounts in a single device. Such device may require an authorization code or biometric identification to grant permission to use stored passcodes. Often such devices only require a single instance of an authorization code or biometric identification to establish persistent authentication using the device. Alternatively, some devices may require reentry of an authorization code at predetermined intervals, upon powering off/on a device, or for each and every use. Such devices are often designed such that a user must initiate a manual interaction with the device in order to utilize a stored permission. For example, a permission stored on a user's cell phone may require the user to launch an application on the phone to provide a permission or remove the phone from a pocket to place in proximity to an authentication requestor such as a proximity access card reader.

Those of ordinary skill in the art will recognize that, while incorporation of multiple permissions in to a single persistent authentication device may offer conveniences to a user, doing so may undermine the security which such permissions are designed to provide. For example, a cell phone authorized to provide authentications to multiple authentication requestors may create a security risk if the owner of the cell phone, and authorized user of the permissions, is no longer carrying the phone. In addition, safeguards such as revoking permissions at predetermined intervals or after each use may undermine the convenience provided by a persistent system of authentication as a timed interval may not correlate to a need for reauthorization of a permission. Further, incorporation of persistent authentication in to a device which is designed to be carried as opposed to worn may create the need for additional manual interaction with a device which further reduces the convenience of such a means of persistent authentication. Such devices designed for carry as opposed to for wear are also prone to loss or theft while permissions are still authorized.

SUMMARY

The invention relates to user authentication, and in particular a method employing a wearable device capable of providing persistent authentication in alarm monitoring systems. The method and system described herein allows persistent authentication but incorporates a conditional disablement likely to coincide with an indication that a user is no longer in physical possession of an authentication device. In addition, the method and system incorporate a source of persistent authentication in a wearable device to further increase the convenience of the persistent authentication device The invention further relates to activating a wearable device in response to an enablement indication, in which the enablement indication may be generated in response to a physical change in the wearable device. A permission is granted in response to authorization data. The wearable device is deactivated in response to a disablement indication, the disablement indication being generated in response to a physical change in the wearable device. The permission may also be revoked.

In another aspect, a method of the invention may receive the permission from a permission source, wherein the permission source is associated with an alarm monitoring system; initiating an authentication request to arm or disarm the alarm monitoring system; and transmitting the permission to an authentication requestor.

In yet another aspect, the permission source may include an alarm monitoring system profile, an authorization token system, a password database with wireless or wired network connectivity, USB, RF or other physical or proximate data transfer interface, a micro SD card or other storage device, or a physical key or interface.

In yet another aspect, the authentication requestor may include an alarm monitoring system interface, a wireless receiver, a data reader, or a physical interface.

In yet another aspect, the enablement indication may include a physical contact or separation, a physical displacement, an electrical signal, a magnetic signal, or a biometric characteristic.

In yet another aspect, the disablement indication may include a physical contact or separation, a physical displacement, disruption of an electrical signal, a magnetic signal, or a biometric characteristic.

In yet another aspect, the authorization data may include accelerometer data, a data point, a string of data, an array of data, a data file, a sequence of data, a biometric characteristic, a device identifier, a passcode, an authentication token, a user identifier, a geographic location, a temporal value, or a physical device.

In yet another aspect, the permission may include accelerometer data, a data point, a string of data, an array of data, a data file, a sequence of data, a biometric characteristic, a device identifier, a passcode, an authentication token, a user identifier, a geographic location, a temporal value, and a physical device.

In yet another aspect, the wearable device may include an enablement component, configured to receive an enablement indication, and to receive a disablement indication. A communication component is configured to receive authorization data from an authorization interface. Processing circuitry has a processor and a memory in which the memory stores programmatic code that, when executed by the processor, configures the processor to activate the wearable device, grant a permission, utilize the permission, deactivate the wearable device, and revoke the permission.

In yet another aspect, the wearable device may further include a bracelet, an anklet, a necklace or other piece of jewelry, a wrist watch, a wearable smart device, eyeglasses, sunglasses, an armband, a waistband, or a belt or other clothing item with a latch, clasp, clip, lock, pin, buckle or fastener.

In yet another aspect, the enablement component may include a physical connector, an electrical circuit, a magnetic field, or a biometric sensor.

In yet another aspect, the communication component may include a data bus, a wireless communicator, a magnetic storage interface, an electronic storage interface, or a cavity, compartment, mount point or other physical interface.

In yet another aspect, the communication component may be further configured to receive the permission from a permission source, and transmit the permission to the authentication requestor.

In yet another aspect, the processor may be further configured to store the permission.

In yet another aspect, the authorization interface may include a data storage device, a keypad, a touchscreen, a biometric reader, an electronic signal, a wireless communicator, a mechanical actuator, or a physical device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

For simplicity and ease of explanation, the invention will be described herein in connection with various embodiments thereof. Those skilled in the art will recognize, however, that the features and advantages of the invention may be implemented in a variety of configurations. It is to be understood, therefore, that the embodiments described herein are presented by way of illustration, not of limitation.

Wearable Device Infrastructure

Figure 1:
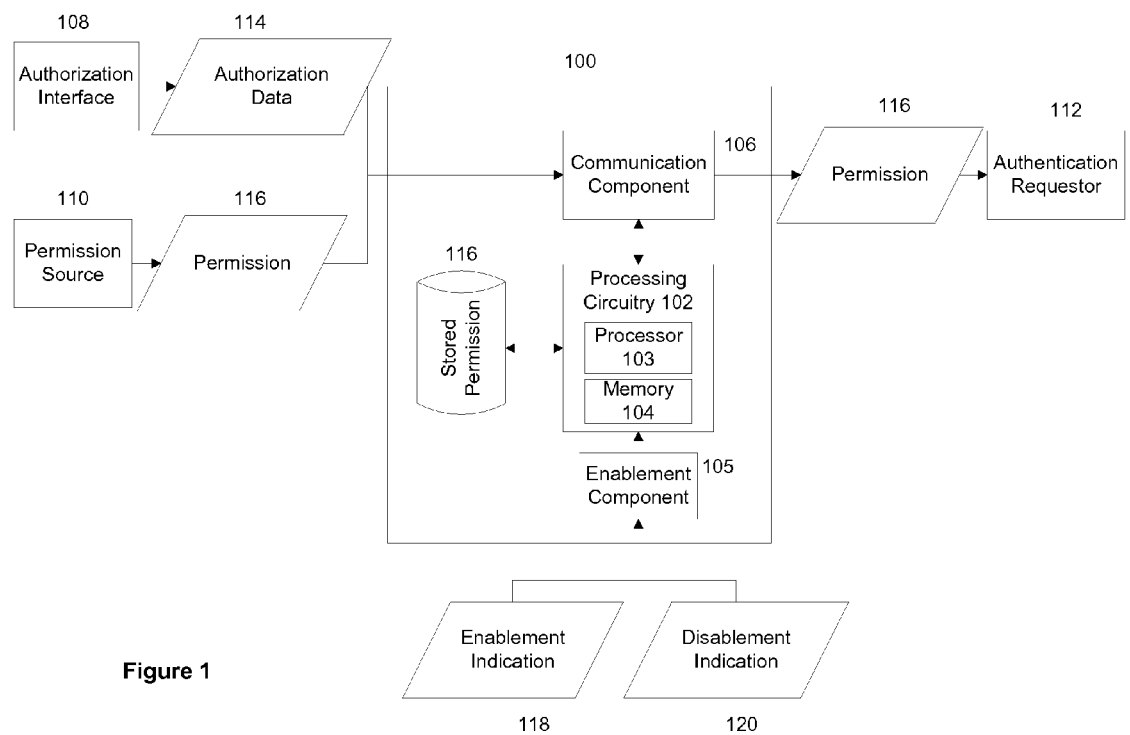
FIG. 1 is a block diagram of an illustrative embodiment of a system of the present invention.

The figures will be used to illustrate aspects of the invention. As shown in FIG. 1, in one embodiment a wearable device 100 for facilitating a method of persistent authentication may include one or more enablement components 105, processing circuitries 102, having processor 103 and memory 104, and/or communication components 106. Wearable device 100 may interface with authorization interface 108, permission source 110, and/or authentication requestor 112, in accordance with the invention.

Figure 2:
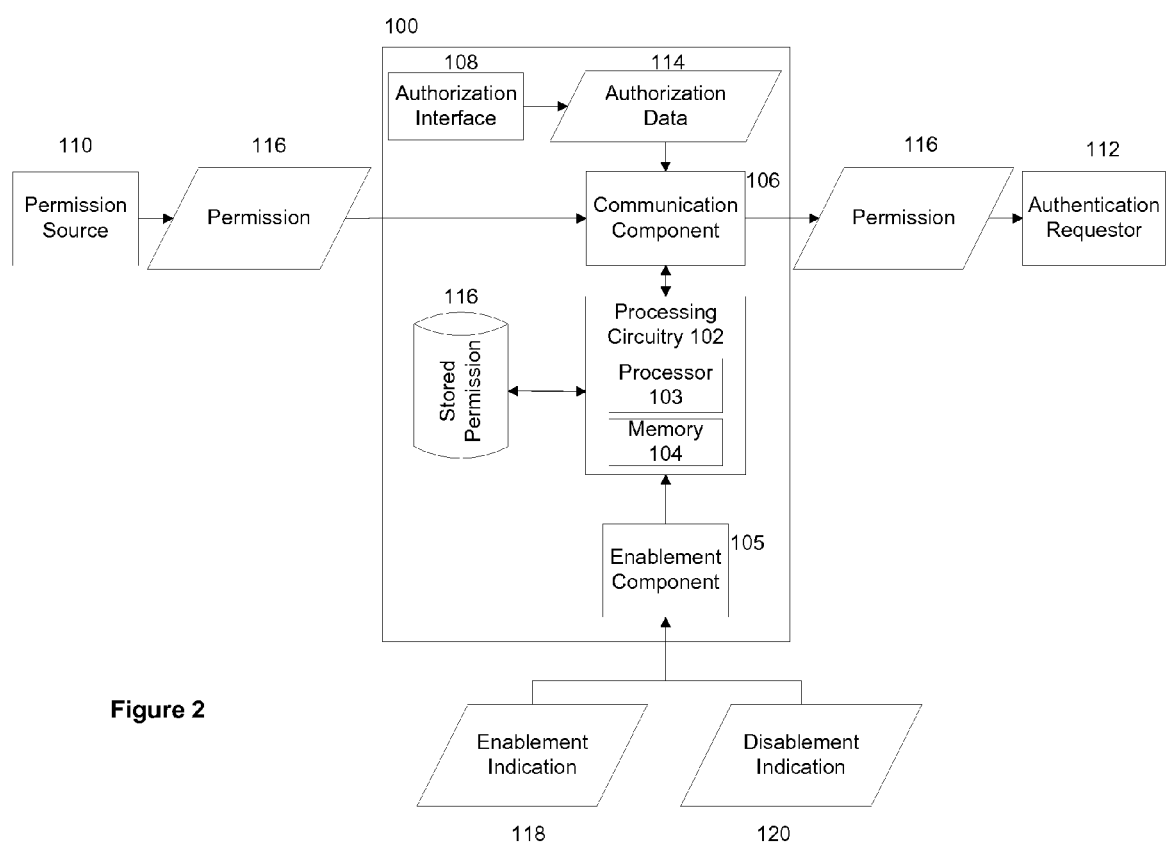
FIG. 2 is a block diagram of another illustrative embodiment of a system of the present invention.

Alternatively, as shown in FIG. 2, wearable device 100 may also include one or more authorization interfaces 108, in addition to one or more enablement components 105, processing circuitries 102 (also having processor 103 and memory 104), and/or communication components 106. In this embodiment, wearable device 100 may interface with permission source 110, and/or authentication requestor 112, in accordance with the invention. Each component is discussed in more detail below.

Wearable device 100 is not particularly limited as long as it is configured to incorporate enablement component 105, processing circuitry 102, communication component 106, and/or authorization interface 108. It may include, for example, a bracelet, an anklet, a necklace, an earring or other piece of jewelry, a wrist watch, a wearable smart device, eyeglasses, sunglasses, an armband, a waistband, a belt and/or other clothing item with a latch, clasp, clip, lock, pin, buckle or fastener. It should be understood that not all of such devices may be utilized in a given embodiment.

In one embodiment and as noted above, processing circuitry 102 includes processor 103 and memory 104. In this embodiment, memory 104 may be volatile or not volatile memory that stores programmatic code executable by processor 103 to perform the functions described herein with reference to the processing circuitry 102. Processor 103 may be a traditional processor such as a central processing unit (CPU).

In addition to a traditional processor and memory, processing circuitry 102 may comprise integrated circuitry for processing and/or control, e.g., one or more processors and/or processor cores and/or FPGAs (Field Programmable Gate Array) and/or ASICs (Application Specific Integrated Circuitry). Processing circuitry 102 may comprise and/or be connected to and/or be adapted for accessing (e.g., writing to and/or reading from) memory 104, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 104 may be adapted to store code executable by control circuitry and/or other data, e.g., data pertaining to communication, e.g., configuration and/or address data of nodes, etc. Processing circuitry 102 may be configured to control any of the methods described herein and/or to cause such methods to be performed, e.g., by a device that includes processing circuitry 102. Corresponding instructions may be stored in the memory 104, which may be readable and/or readably connected to the processor 103. In other words, processing circuitry 102 may include a controller, which may comprise a microprocessor and/or microcontroller and/or FPGA (Field-Programmable Gate Array) device and/or ASIC (Application Specific Integrated Circuit) device. It may be considered that processing circuitry 106 includes or may be connected or connectable to memory, which may be adapted to be accessible for reading and/or writing by the controller and/or processing circuitry 102.

Enablement component 105 is not particularly limited as long as it is configured to receive enablement indication 118, generated in response to a physical change in wearable device 100, to activate wearable device 100 and/or disablement indication 120, generated in response to a physical change in wearable device 100, to deactivate wearable device 100. Enablement component 105 may include, for example, a physical connector, an electrical circuit, a magnetic field, and/or a biometric sensor. It should be understood that not all of such components may be installed within a given device. It should be further understood that the devices may operate independently, or in conjunction with other enablement components, in accordance with the invention.

Physical connectors may include any device having one mechanical state distinguishable from another, for example, a pin, buckle, a latch, a clasp, a lock, a clip, a button, a switch, or a lever. For example, wearable device 100 may be a bracelet, watch, piece of jewelry, or smart wearable device which includes a pin, buckle, lock or clasp to secure it to a user. Enablement indication 118 may be derived from the open or closed status of the buckle or lock, or status or change in status of a clasp. It should be understood that physical connectors may not come in contact with each other as proximity may suffice for purposes of the invention. For example, wearable device 100 may be a bracelet with connectors at each end whose connection is established when each end is within a short distance of the other. Such connectors may be disconnected when separated by a greater distance, perhaps through bending or flexing another portion of the bracelet, and/or changing the position of a hinge in another portion of the bracelet, perhaps done to allow a user to expand the opening between the connectors to put on or remove the bracelet.

Electrical circuits may allow for or prevent the flow of current, dissipation of a capacitor, operations of logic, access to data, or other lower or higher functions associated with electronic devices and/or computing well known to those of ordinary skill in the art. Continuing the previous example, wearable device 100 in the form of a bracelet may incorporate an electrical circuit that is electrically open when not in use, but replaces the electrical open circuit with a short to complete the electrical circuit when the clasp or buckle pieces are in physical contact or proximity.

A magnetic field may result from the incorporation of natural magnets, electrical magnets, or other devices known to those of ordinary skill in the art to produce characteristics associated with magnetic fields. Such fields may be of use in the invention either through the creation or disruption of the field itself or through utilization of the characteristics. For example, wearable device 100, in the form of a bracelet, may incorporate an electro-magnet which is activated when a switch, e.g., button, is depressed or actuated as the result of pressure input as a result of placement of the bracelet against a user's wrist. Actuation of the switch may physically reposition a portion of an electrical circuit within the coil of another electrical circuit to establish a polar magnetic field. Further, such field may result in physical displacement of another device, establishing a short to electrically close yet another electric circuit, allowing for electrical current and/or other information to reach processing circuitry 102. Alternatively, the magnetic field discussed above may be used for its inductive properties in the establishment of a filter or other electrical sub-circuitry which allows for transmission of a signal, current, or other data to processing circuitry 102. The examples above are given for purposes of illustration and in no way limit the use of magnetic fields beyond uses known to those of ordinary skill in the art.

A biometric sensor may gather a descriptive feature, unique to or useful in identifying a user, and/or useful in distinguishing an unauthorized user from an authorized one. For example, wearable device 100 may include a thumb or fingerprint scanner. Such scanner may identify a user through a comparison of enablement indication 118 consisting on identifiable data points included in a finger print with data collected during provisioning of wearable device 100, as described below. If authorization data matches data collected during provisioning to at least a significant degree, a successful identification may be made, and wearable device 100 may be enabled. Alternatively, wearable device 100 may be a pair of sun or eye glasses. Such device may utilize a retina scanner to identify an authorized user, based upon a comparison with data provided during provisioning. Enablement upon establishing an authorized user may persist so long as a periodic verification may be established. For example, wearable device 100 may again gather enablement indication 118 at a set interval or based upon usages as established by permission 116.

Physical connectors and biometric sensors may be used in conjunction with each other. For example, a contact sensor incorporated in a glove may use both detection of physical contact and/or detection of a finger print. Additionally, such a device may include temperature or heart rate sensors. Such additional devices may gather enablement indication 118 persistently or initially. For example, an initial collection of enablement indication 118 may be used in comparison to data provided during provisioning to establish an authorized user. Alternatively, enablement component may detect the presence of a heart rate, such as would be provided if a glove or wristband were worn, but no longer persist if the device was removed. Those of ordinary skill in the art will recognize that use of initial data in conjunction with authorization data, described below, may be sufficient for purposes of the invention. Additionally, those of ordinary skill in the art will recognize that persistent gathering of biometric and physical contact data may further increase the security of the invention.

Processing circuitry 102 is not particularly limited as long as it is programmed to activate wearable device 100, grant permission 116, utilize permission 116, deactivate wearable device 100, revoke permission 116, and/or store permission 116. Construction of and methods of utilizing processing circuitry 102 may incorporate any electrical and/or mechanical device or system which may facilitate a method of persistent authentication, in accordance with the invention. Processing circuitry 102 may be incorporated in a single component as shown in FIG. 1, or consist of an array of processing units, such as those used in grid computing or mesh network topologies. For example, wearable device 100 may incorporate one or more processing circuitries 102 which perform a subset of routines of the invention, perhaps utilizing permission 116 and revoking authorization, while an external processing circuitry 102 accessible to wearable device 100 through communication component 106 may be configured to grant authorization of permission 116. Yet another unit of processing circuitry 102, such as in a removable storage device, may store and/or select permission 116 for use in an embodiment of the method of the invention. Those of ordinary skill in the art will recognize all of or at least a portion of processing circuitry 102 may not be physically contained within wearable device 100. For example, processing circuitry 102 may be in a server farm and interface with other portions of wearable device 100 through communication component 106. Creation, incorporation, and use of such processors are well known to those of ordinary skill in the art and shall not be further elaborated upon here.

Communication component 106 is not particularly limited as long as it is configured to receive authorization data 114 from authorization interface 108, receive permission 116 from permission source 110, transmit permission 116 to authentication requestor 112, and/or transmit/receive data and permission 116 to/from processor 100. It may include, for example, a data bus, a wireless communicator, a magnetic storage interface, and/or an electronic storage interface. It should be understood that not all of such devices may be installed within a given component. It should also be understood that more than one such device may be included, such as in a network configuration. Such a configuration may incorporate multiple devices for redundancy and/or distribution of functions.

Communication component 106 may be physically incorporated in the design and construction of wearable device 100. For example, communication component 106 may be a wireless device, configured to receive and transmit data or other signals to other components and/or devices incorporated in the invention. In another example communication component 106 may be an I/O bus compatible with a flash storage device, a keypad or array of buttons, a magnetic data interface, and/or processing circuitry 102. Alternatively, communication component 106 may include both a wireless radio device, perhaps for interfacing with permission source 110 and/or authentication requestor 112, and an I/O bus for other functions, such as for interfacing with processing circuitry 102.

Alternatively, communication component 106 may be at least a portion of a magnetic storage system, such as a strip of magnetic material configured to have data written to, and received from, the material. For example, permission 116 may be stored within wearable device 100 by swiping a magnetic strip incorporated within wearable device 100 through the interface of a device arranged to write the permission to the magnetic material. Permission 116 may be transmitted to authentication requestor 112 by swiping the magnetic strip incorporated within wearable device 100 through an interface of a device capable of reading the permission. Alternatively, permission 116 may be transmitted to authentication requestor 112 using a different portion of communication component 106, such as an RF transmitter/and or receiver which may be used by a proximity detector.

In yet another alternative, communication component 106 may be a storage interface such as a micro SD slot or USB port. Such interface may be used to receive authorization data 114 or permission 116 stored on a removable storage device in preparing wearable device for use. Such an interface may further be used to transmit permission 116 to authentication requestor 112. For example, an authentication system may be incorporated in a computer or other electronic system which is inoperable, inaccessible, or locked unless or until permission 116 is provided. Such system may be further designed to receive permission 116 through a USB port. Wearable device 100 may incorporate a compatible interface in its design as part of communication component 106.

At least a portion of communication component 106 may be housed independently of wearable device 100. It is well known to those of ordinary skill in the art communication component 106 may utilize devices and systems which are not incorporated within wearable device 100. For example, a wireless communication network may be used in conjunction with the invention. Requirements and operation of such external devices and systems which may be utilized by communication component 106 are well known to those of ordinary skill in the art and shall not be further elaborated upon here.

Authorization interface 108 is not particularly limited as long as it is configured to generate authorization data 114 in response to a user input, in accordance with the invention. It may include, for example, a data storage device, a keypad, a touchscreen, a biometric reader, an electronic signal, a wireless communicator, a mechanical actuator, and a physical device. It should be understood that not all of such devices may be installed within a given component.

Authorization interface 108 may be an external device or component of an external device (as shown in FIG. 1), incorporated as a component of wearable device 100 (as shown in FIG. 2), or a combination of these configurations.

Those of ordinary skill in the art will further recognize authorization interface 108 as a component configured to receive an input which may serve as a password, key, decryption or other means of security. For example, authorization interface 108 may be part of an authentication token system, or universal authentication token system. In such an example, authorization interface 108 may be used in conjunction with other aspects of the system to generate, request, and/or obtain access to a token, eliminating the need to store a highly valuable permission on or within wearable device 100. Examples of highly valuable permissions may include a bank account number, credit card number, email account/password, social security number, etc. Still further, those of ordinary skill in the art will recognize the utility of authorization interface 108 as an additional layer of security, increasing the complexity of the invention when viewed in conjunction with enablement component 105.

In one embodiment, authorization interface 108 may be an input device incorporated in wearable device 100, including but not limited to a keypad, touchscreen, array of buttons, voice analyzer or analytics, etc. Such device may provide a user a means of providing a unique security identifier. Alternatively, such device may be a stand-alone device configured to provide similar input, coupled with a portion of communication component 106. In another alternative, such device may be incorporated in another device, such as a web application, tablet, computer, or smart phone which may include another portion of communication component 106, such as a Wi-Fi transmitter or cellular radio, capable of transmitting authorization data 114 to a portion of communication component 106 within wearable device 100. For example, a user may utilize an application running on a smart phone, designed to receive an alphanumeric passcode from a touch screen, and transmit either the passcode or a derivative code indicating either successful entry of a correct passcode or an incorrect attempt to enter a passcode.

In another embodiment, authorization interface 108 may be a retina or fingerprint reader or other source of biometrics, used independently, as a multiplicity of biometric readers, and/or in conjunction with other authorization interfaces. For example, wearable device 100 may be a pair of sunglasses which includes a retina scanner capable of distinguishing who is wearing the glasses to ensure that only an authorized user of permission 116 may have access to those permissions.

Permission source 110 is not particularly limited as long as it is configured to transmitting permission 116 to communication component 106. It may include, for example, an alarm monitoring system profile, an authorization token system, a password database with wireless or wired network connectivity, USB, RF or other physical or proximate data transfer interface, a micro SD card or other storage device, a physical key or interface, etc. It should be understood that not all of such devices may be installed within a given source.

In one embodiment, permission 116 may be a code to lock/unlock a vehicle door and/or start an engine. This code may be assigned to a vehicle and associated key, and stored in permission source 110 consisting of an electronic database under the control of the manufacturer or other entity in a supply chain, a file in a vehicle computer, a lock device in a vehicle door, and/or a flash storage device in a key or key fob. Any such embodiment may be permission source 110 as long as it is capable of transmitting permission 116 to communication component 106. Continuing the example above, a database may have a wired or wireless network interface which may push permission 116 to communication component 106, or transmit permission 116 in response to a request initiated by communication component 106 or processing circuitry 102.

Alternatively, permission source 110 may be a key fob, which includes an array of buttons or other input devices which may be used to transmit permission 116 using a short range transmitter, perhaps in conjunction with Bluetooth protocols, which may be received by communication component 106.

In yet another example, wearable device 100 may be a configurable option included in the same supply chain from the same source as the vehicle of the examples above. Permission 116 may be a physical device that includes permission data or may be the actual data itself. For example, permission 116 may be transmitted at the vendor, dealer, or other entity included in the supply chain to communication component 106 by connecting a USB port embedded in wearable device 100 to a USB port on a personal computer with access to a corporate database which includes a set of permissions 116. Further expanding upon this example, permission 116 may be transmitted from permission source 110 to communication component 106 earlier in the supply chain, perhaps during manufacturing or construction of the vehicle of the previous examples and/or wearable device 100. In such an embodiment, the design of wearable device 100 may incorporate a static data storage device such as an EPROM or ROM, or a dynamic data storage device such as an EEPROM or flash memory (e.g., integrated or removable 'thumb drive', compact flash, SD, micro SD, etc.). Permission 116 may be written or transmitted to such a device prior or subsequent to incorporation in wearable device 100, creating either a permanent or temporary stored permission 116 within wearable device 100.

In another embodiment, permission 116 may be a bank account or credit card number or identifier. Such permission 116 may be transmitted by permission source 110, including a magnetic data writer, to a strip of magnetic storage material incorporated in communication component 106.

In yet another embodiment, permission 116 may be a personal identifier, such as a social security number, employee serial number, correctional facility trustee identifier, telephone number, home address, etc. Such permission 116 may be housed in a passive RF device, such as a wireless identification tag. Such permission 116 may be permanently or temporarily embedded in a securable cavity or compartment, incorporated in wearable device 100. In such an embodiment, the process of "embedding" permission 116 may be construed as transmission while communication component 106 may consist of the cavity or compartment. Alternatively, permission 116 may be soldered, welded, glued, or otherwise affixed to communication component 106, consisting of a mount point incorporated in wearable device 100. For example, permission 116 may contain information pertaining to a hotel guest stored in a rewritable RFID tag serving as permission source 110. Such permission source may be placed in a compartment within wearable device 100 for use during the guest's reservation. Upon departure, a guest may remove the tag and return wearable device 100. Those of ordinary skill in the art will recognize the utility of this embodiment as it allows for more elaborate, appealing, or comfortable reusable wearable devices while providing enhanced security for the guest, who may take or destroy the tag upon departure. Added security may include use of a token stored on the tag, with actual guest information residing on a hotel server or a guest's personal computer or smart phone.

Authentication requestor 112 is not particularly limited as long as it is configured to receive permission 116 from communication component 106. Authentication requestor 112 may include, for example, a wireless receiver, a data reader, or a physical interface as well as processing circuitry configured to perform the authentication requesting functions described herein. It should be understood that not all of such devices may be installed within a given requestor.

Those of ordinary skill in the art will recognize authentication requestor 112 may be similar in design, construction, and function to devices used to control access to locations, alarm monitoring systems, vehicles, computers, equipment, machinery, structures, data, etc. Details of such access control devices are well known to those of ordinary skill in the art and shall not be further elaborated upon here.

Internally, processing circuitry 102, enablement component 105, communication component 106, authorization interface 108, permission source 110, and authentication requestor 112 contain electronic systems of varying sophistication involving hardware and in some cases a version of firmware or software, the operation of which is well known to those of ordinary skill in the art and will not be elaborated upon here. It should be understood that not all of such devices may be installed within a given component.

Those of ordinary skill in the art will appreciate that all of the aforementioned components of wearable device 100: processing circuitry 102, enablement component 105, communication component 106, and authorization interface 108, as well as additional devices of the invention: permission source 110, authentication requestor 112, and authorization interface 108, are not particularly limited in construction as long as they operate in accordance with the functions described herein. They may incorporate any of a number of commonly known hardware and software technologies, such as relational databases, Linux and other operating systems, flash memory and other forms of storage memory, single or multi-core microprocessors such as ARM processors or others, DSP's, embedded controllers, etc.; one or more parts of which may be located at the premises or at a remote location such as a monitoring center, a manufacturer, an insurer, a cloud-based solution, the system owner's mobile device, or elsewhere.

Provisioning of wearable device 100 for operation in accordance with the invention may include any modifications, adaptions, and/or procedures necessary for the device to operate as described herein. Provisioning of wearable devices, electronic wearable devices, mechanical wearable devices, authentication devices, or any combination thereof is well known to those of ordinary skill in the art and will not be further elaborated upon here. It is also well known to those of ordinary skill in the art that provisioning wearable device may include utilization of devices and methods not of use in the method of the invention. For example, provisioning may require programming of a flash memory device, integrated circuit, or other ROM device in a manufacturing facility. In another example, provisioning may include connection to a computer device using a universal serial bus, connector port(s) and cable to gather unique information about wearable device 100 (e.g., a MAC address, serial number, model number, place, make, or country of origin, etc.) or provide, link, or make ready other information (e.g., a user profile, credentials, title, charge, marital status, nationality, political affiliation, etc.) It should be understood that the provisioning described herein is provided as examples of preparing wearable device 100 for operation in accordance with the invention and in no way limit the scope of the invention.

Method for Controlling Enablement of a Wearable Authentication Device

Figure 3:
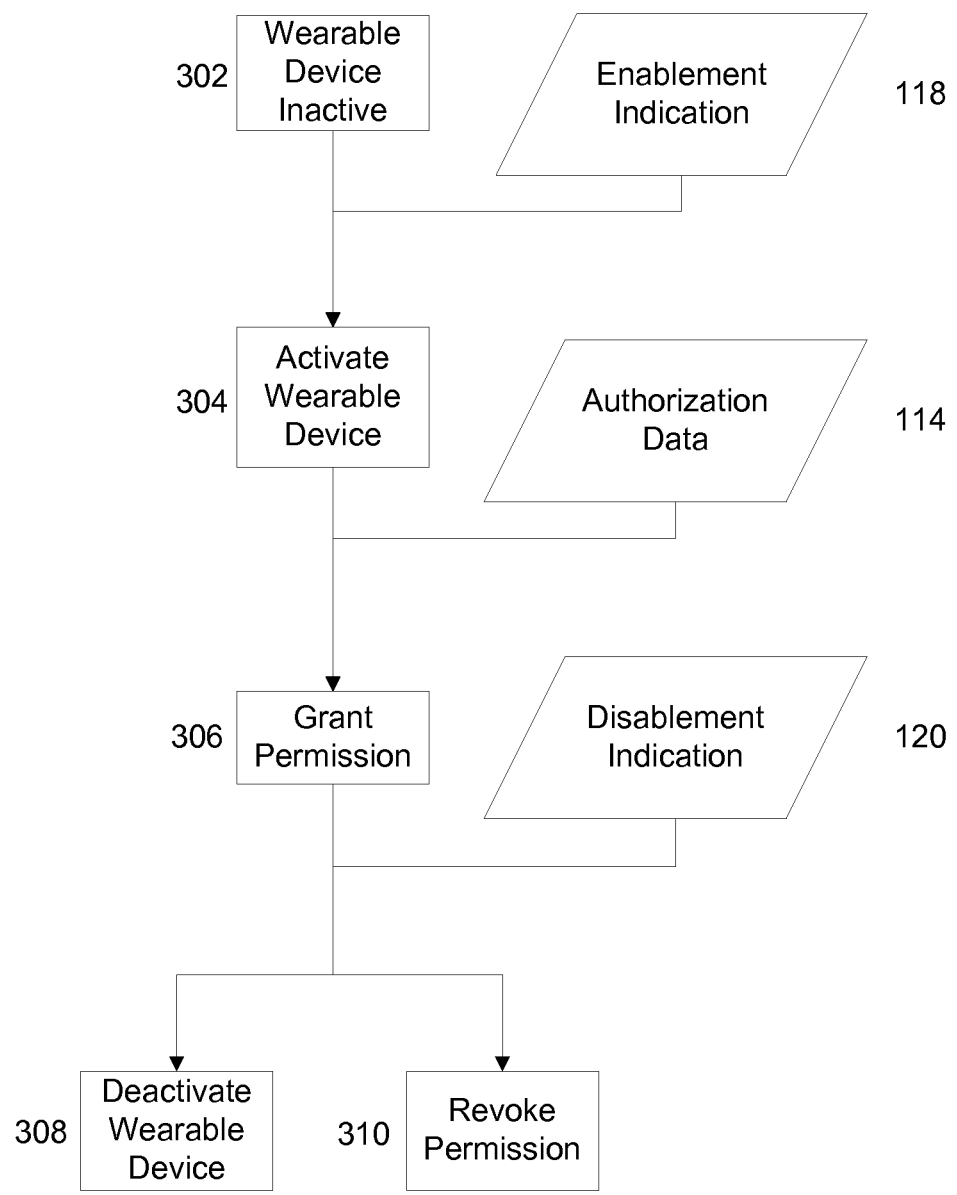
FIG. 3 is a flowchart of an illustrative embodiment of a method of the present invention.

FIG. 3 illustrates an example method for controlling enablement of wearable device 100. While wearable device 100 is inactive (302), enablement component 105 may receive enablement indication 118 so that processing circuitry 102 may activate wearable device 100 (304). Communication component 106 may then receive authorization data 114 from authorization interface 108 so that processing circuitry 102 may grant permission 116 (306).

Enablement indication 118 is not particularly limited as long as enablement indication 118 is in a form that is receivable by enablement component 105. Enablement indication 118 may include, for example, a physical contact or separation, a physical displacement, an electrical signal, and/or a magnetic signal. It should be understood that not all of such information may be included in a given indication.

In one embodiment, a physical contact may be the joining of a latch and a buckle. Such contact may allow for flow of another form of enablement indication 118, such as an electrical or magnetic signal, or the contact may actuate a mechanical component. Another example of mechanical actuation may be insertion of a fastener or pin through a clip or clasp, which causes a surface of the fastener or pin to depress and toggle a mechanical switch, which may be capable of activating wearable device 100 through the utilization of devices and methods commonly known to those of ordinary skill in the art when incorporating a mechanical actuator within an electrical system or device.

In another embodiment, a physical displacement may be the actual of switch, e.g., the depression of a button or actuation of a trigger. For example, wearable device 100 may consist of a pair of sunglasses. Such glasses may include a button in the joint between the lens frame and at least one arm. Such button may be depressed and actuated when the arm(s) is fully extended as in preparation for wearing the glasses. The invention may incorporate the depression of such a button as enablement indication 118.

In yet another embodiment, an electrical signal may be a current which flows through a circuit completed upon enabling wearable device 100. For example, a smart watch may have a power source, ohmmeter, and flexible wiring running through a wristband. Such a device may also have connectors in a buckle or clasp which complete a circuit capable of conducting a current when joined. Enablement indication 118 may be a resistance value detected by the meter compared to an anticipated value or a threshold. Alternatively, enablement indication 118 may be a current derived from the input to the meter and compared to an anticipated value, the presence or absence of, or a threshold.

In yet another embodiment, a magnetic signal may emanate from a change in a magnetic field which results from activating wearable device 100 (302). For example, connecting the clasp of a bracelet may result in completion of an electric current which generates an electromagnetic field. Such field may actuate a magnetic material in enablement component 105. Alternatively, readying wearable device 100 by fastening a bracelet clasp may reverse, disrupt, or shield a magnetic field. The absence of a magnetic field may serve as enablement indication 118, and allow for transmission and reception of electrical signals which may have been obstructed or interfered with in the presence of an unshielded magnetic field.

Authorization data 114 is not particularly limited as long as authorization data 114 can be generated and transmitted by authorization interface 108, and/or received by communication component 106. Authorization data 114 may include, for example, accelerometer data, a data point, a string of data, an array of data, a data file, a sequence of data, a biometric characteristic, a device identifier, a passcode, an authorization token, a user identifier, a geographic location, a temporal value, and/or a physical device. It should be understood that not all of such information may be included in a given instance of data.

Authorization data 114 may vary in complexity including, for example, a data point, a string of data, an array of data, a data file, and/or a sequence of data. Those of ordinary skill in the art will recognize the differences in such forms of data, and further recognize instances for which each may be appropriate, therefor these data forms shall not be further elaborated upon here.

In one embodiment, accelerometer data containing a series of motions at various rates and changes of velocity and/or direction may be collected as authorization data 114, and compared to a another series of accelerometer data to determine if there is a substantial similarity. Such similarity may serve as authorization to grant permission 116. For example, a user may enable wearable device 100, consisting of a wrist watch. The user may further attempt to have processing circuitry 102 grant authorization of permission 116 (308) by making hand motions representative of those made when signing the user's name. Such motions may be compared to a previously established set of motions recorded when user provisioned wearable device 100 to determine if there is substantial similarity, and processing circuitry 102 may grant permission 116 if such a similarity is determined to be present.

Those of ordinary skill in the art will further recognize that authorization data 114 may be any of the types discussed above or compatible with authorization interface 108 and/or communication component 106, also discussed above.

Permission 116 is not particularly limited, as long as permission 116 can be generated and transmitted by permission source 110 and/or communication component 106, storage by processing circuitry 102, and/or received by authentication requestor 112. It may include, for example accelerometer data, a data point, a string of data, an array of data, a data file, a sequence of data, a biometric characteristic, a device identifier, a passcode, an authorization token, a user identifier, a geographic location, a temporal value, and/or a physical device. It should be understood that not all of such information may be included in a given instance of data.

Permission 116 may vary in complexity including, for example, a data point, a string of data, an array of data, a data file, and/or a sequence of data. Those of ordinary skill in the art will recognize the differences in such forms of data, and further recognize instances for which each may be appropriate, therefor these data forms shall not be further elaborated upon here.

Those of ordinary skill in the art will further recognize that permission 116 may be any of the types discussed above or compatible with permission source 110 and/or authentication requestor 112, also discussed above. For example, permission 116 may be an authorization token configured to provide verification credentials to a network system, or universal authentication token capable of providing verification credentials to multiple network systems. Network systems are not particularly limited but may include, credit card or bank payment systems, remote corporate intranet access systems, social media or other online password protected areas of the internet, alarm management systems, and/or premises controlled access systems.

Enablement component 105 may also receive disablement indication 120 so that processing circuitry 102 may deactivate wearable device 100 (308). Processing circuitry 102 may also revoke permission 116 (310). Those of ordinary skill in the art will recognize that revocation 310 may occur prior to deactivation 308, either out of necessity due to the design, configuration, and connections of components of wearable device 100, or due to preference. The order in which these steps are performed is not particularly limited so long as the order allows for execution of each step, in accordance with the invention.

Disablement indication 120 is not particularly limited, as long as disablement indication 120 can be received by enablement component 103. Disablement indication 120 may include, for example, a physical contact or separation, a physical displacement, disruption of an electrical signal, and/or disruption of a magnetic signal. It should be understood that not all of such information may be included in a given indication.

In one embodiment, disablement indication 120 may include an instance of information of the variety mentioned above. Alternatively, disablement indication 120 may include the absence of enablement indication 118. For example, wearable device 100 may be designed such that enablement indication 118 includes an electric current which flows through a bracelet when two connectors of a clasp are joined, and designed such that disablement indication 120 provides an interruption and/or absence of current which may not flow through a bracelet when the two connectors are not joined, which results in an open electrical connection in the previously shorted electrical circuit.

Those of ordinary skill in the art will recognize the similarity of data types which may comprise either disablement indication 120 and/or enablement indication 118. Such data types are discussed above in detail and shall not be further elaborated upon here.

Those of ordinary skill in the art will appreciate that all of the aforementioned embodiments of controlling enablement of wearable device 100 are not limitations of the invention, but rather given as examples of its operation. Other methods for controlling enablement of a wearable authentication device may be possible as long as they function in accordance with the invention.

Method for Providing Permissions in Conjunction with a Wearable Device

Figure 4:
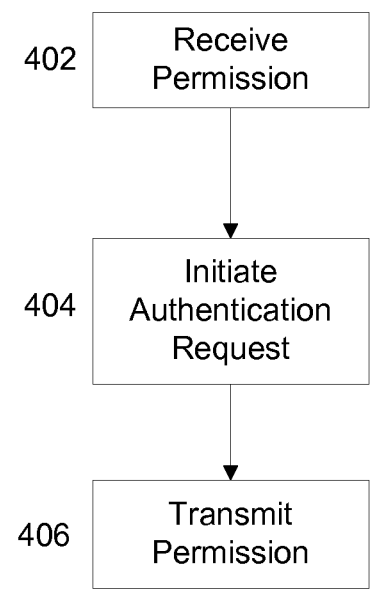
FIG. 4 is a flowchart of an another illustrative embodiment of a method of the present invention.

FIG. 4 illustrates a method for providing permissions in conjunction with wearable device 100. Processing circuitry 102 may receive permission 116 (402) from permission source 110. Wearable device 100 and/or authentication requestor 112 may initiate an authentication request (404), which may cause communication component 106 to transmit permission 116 to authentication requestor 112 (406), for example to a wireless receiver, a data reader and/or a physical interface of authentication requestor 112.

Those of ordinary skill in the art will recognize the similarity of the method described above and other methods for authentication well known in the art.

Those of ordinary skill in the art will further recognize the utility of utilizing wearable device 100 in such a method for several reasons, including the additional measures of security provided through wearable device's 100 enablement, disablement, and other functions, and the convenience and security of wearable device's 100 ability to function as a unified permission source, eliminating the need to utilize and account for several individual permission sources 110.

Select Embodiments

In one embodiment, wearable device 100 may be intended for use with an alarm monitoring system. Wearable device 100 may be provisioned such that it may utilize permission 116, including an alarm monitoring system passcode which allows a user to change the state of the alarm monitoring system by changing between armed and disarmed states. Those of ordinary skill in the art will recognize the utility of a wearable device configured to initiate these state changes both for the convenience of being able to use a device already on one's person as opposed to an alarm monitoring system keypad or other user interface, as well as for the increased functionality of the system by reducing occurrences of false alarms which may arise if a user does not enter a disarm passcode on a keypad or other interface within a predetermined disarm time period. Those of ordinary skill in the art will also recognize a wearable device which incorporates such permission as further increasing the utility of an alarm monitoring system by providing a convenient way to arm an alarm monitoring system upon exiting a structure at a premises or other action which may occur in conjunction with the desire to change the state of a system to an armed state.

Methods of provisioning wearable device 100 for use with an alarm monitoring system may occur as previously described or through other methods of programming an electronic device to provide permission 116 to authentication requestor 112 commonly known to those of ordinary skill in the art. For example, wearable device 100 may have a wireless communicator, such as a Bluetooth radio which may be used to store permission 116 within wearable device 100 upon inputting the passcode with a tablet or computer running an application capable of managing passcodes for an alarm monitoring system.

After provisioning wearable device 100 for use with an alarm monitoring system at a premises, a user may activate wearable device 100 (304). For example, wearable device 100 may be a smart watch with enablement component 105 consisting of a clasp. Closing the clasp to secure the watch after placing it around the user's wrist may actuate a switch or button which is depressed by the clasp. Depressing such switch or button may generate enablement indication 118, consisting of completing or activating an electrical circuit carrying a current which may then activate wearable device 100 (304).

A user may then provide authorization data 114 so processing circuitry 102 may grant permission 116 (306). A user may be prompted to provide authorization data 114 or initiate input of authorization data 114. For example, upon activation 304, wearable device 100 may use communication component 106 to send a text message to a cell phone account provided by a user during provisioning. A user may use a cell phone as authorization interface 108 to reply to this text message with authorization data 114, consisting of a passcode, affirmation of a desire for processing circuitry 102 to grant permission 116 (306), or other anticipated response as specified during provisioning. Alternatively, a user may input authorization data 114 using an alarm monitoring system keypad as authorization interface 108 or a web interface accessed through a personal computer which may manage permissions for an alarm monitoring system.

Such authorization interface 108 described above may transmit a signal to communication component 106 so that processing circuitry 102 may grant permission 116 (306).

With permission 116 granted, a user may utilize wearable device 100 as a persistent authentication source for an alarm monitoring system. For example, such a system may incorporate a wireless receiver, such as those used in proximity card readers, to control access at an entry point to a structure at a premises. Those of ordinary skill in the art will recognize the convenience of incorporating permission 116 in a wearable device such as a smart watch with use of a proximity access controller located in or near a door knob or handle. Such a watch may be in close enough proximity to the controller as a result of the motion of using a door knob to open the entry point, eliminating the additional action of swiping an access card or key fob which may otherwise be necessary without use of the invention.

Alternatively, a user may utilize wearable device 100 to interact with an alarm monitoring system interface such as a keypad. Such a keypad may be used to change states of an alarm monitoring system between armed and disarmed states. For example, a user may position wearable device 100 in proximity to a keypad so that permission 116 may be transmitted to authentication requestor 112, consisting of a keypad with a wireless receiver. Such permission 116 may be transmitted to a keypad, causing a state change without the need for a user to manually enter a passcode using the buttons of a keypad.

In yet another alternative, a user may make a motion with wearable device 100 which was established during provisioning as a signal for processing circuitry 102 to utilize communication component 106 to transmit permission 116 to authentication requestor 112. For example, provisioning may include a user making clockwise and counterclockwise motions with a smart watch worn on the user's wrist. Accelerometer data generated by such a watch may be recorded during such motions and stored in association with requests for arming and/or disarming a system. Alternatively, characteristic data associated with such motions may be stored within processing circuitry 102 prior to provisioning and without the need for a user to provide a sample of data, perhaps as a step in a manufacturing process which stores data associated with basic shapes or movements. With wearable device 100 activated, a user may make a clockwise motion using the wrist equipped with a smart watch, causing it to transmit a signal to an alarm monitoring system controller with instructions for the system to transition to and/or remain in an armed state. Similarly, a user may make a counterclockwise motion to instruct a controller to disarm a system. Those of ordinary skill in the art will appreciate the use of such a motion to initiate transmission of permission 116 for its ability to communicate with authentication requestor 112 at a greater distance than in proximity, transmit a permission with more detail than to just toggle between states, and select the time of transmission and state change. Use of such a motion may also add additional security to a persistent authenticator, such as wearable device 100. For example, a motion may be more complex than a circular motion, including a sign, symbol, or signature input by a user and captured by wearable device 100 during provisioning.

A user may continue to utilize wearable device 100 as a way to provide persistent authentication with an alarm monitoring system while the wearable device remains active. Those of ordinary skill in the art will recognize that wearable device 100 may also be used with other permissions 116 while also used with an alarm monitoring system.

For example, wearable device 116 may include stored permission 116 for use with a vehicle. Such a vehicle may be equipped with a short range wireless communication device, capable of receiving a digital key to unlock a door when such a key is in proximity with a door handle. Those of ordinary skill in the art will appreciate the utility of incorporating multiple permissions 116 in a single wearable device, eliminating the need to carry multiple authentication devices.

Further, a user may deactivate wearable device 100 (308), thereby revoking permission 116 (310) upon enablement component's 105 receipt of disablement indication 120. Continuing the previous example, a user may unfasten a clasp on a smart watch, actuating a button or a switch to generate disablement indication 120 by creating an electrical signal, or eliminating the presence of enablement indication 118 by disrupting an electrical circuit by creating an open circuit in the path of a current. Those of ordinary skill in the art will recognize the utility of deactivating a wearable authentication device through an action associated with its removal as such deactivation eliminates additional user actions to revoke persistent authentication permissions, and does so at a time when a wearable device is more likely to be utilized by an unauthorized user.

Those of ordinary skill in the art will further recognize that processing circuitry 102 may revoke permission 116 (310) upon the occurrence of an event other than deactivation of wearable device 308. For example, a wearable device designed for use with an alarm monitoring system may be limited to use at a premises. Permission 116 may be revoked (310) if it is determined that wearable device 100 is not at the premises. Including additional requirements such as geographic or temporal limitations may further add to the security of a persistent wearable authentication device by restricting functionality to a more detailed set of conditions in which it may be desirable for wearable device 100 to operate as an authentication device. For example, revoking permission 116 (310) which may only be of use at a particular location may prevent unauthorized authentication requestors from scanning for and detecting permissions for unauthorized use in the future. Such example may apply to a wearable device which stores access permissions for vehicle, home, and business entry points. If persistent authentication applies at all locations, a user may unknowingly walk past a wireless receiver at another premises, such as a public place, which receives such permissions and stores them in conjunction with other information, perhaps a picture of the user analyzed with facial recognition software or a unique identifier transmitted by a user's cell phone. The combination of permissions and other information may be combined to replicate wearable device's 100 ability to transmit permission 116, provide an indication of where permissions may be used, and allow someone to use permissions without authorization. Revoking permissions (310) when in public places where permission 116 may not be of use may reduce or eliminate the chance of such use without authorization.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the invention, which is limited only by the following claims.

What is claimed is:

1. A method of persistent authentication, the method comprising:
    receiving an enablement indication in response to a first physical change to the wearable device;
    activating the wearable device in response to the enablement indication;
    granting a permission at least in response to the activation of the wearable device, the permission being configured to provide authorization for performing at least one action;
    utilizing the permission to cause the at least one action to be performed;
    receiving a disablement indication in response to a second physical change to the wearable device;
    deactivating the wearable device in response to a disablement indication, the disablement indication comprising at least one selected from the group consisting of a physical contact or separation, a physical displacement, an electrical signal, a magnetic signal, and absence of a biometric characteristic; and
    revoking the permission in response to the deactivation of the wearable device.

2. The method of claim 1, further comprising:
    receiving the permission from a permission source, the permission source being associated with an alarm monitoring system; and
    transmitting, to an authentication requestor, an authentication request to one of arm and disarm the alarm monitoring system, the authentication request including the permission.

3. The method of claim 2, wherein the permission source comprises at least one selected from the group consisting of an alarm monitoring system profile, an authorization token system, a password database with wireless or wired network connectivity, USB, RF or other physical or proximate data transfer interface, a micro SD card or other storage device, and a physical key or interface.

4. The method of claim 2, wherein the authentication requestor comprises at least one selected from the group consisting of an alarm monitoring system interface, a wireless receiver, a data reader, and a physical interface.

5. The method of claim 1, wherein the enablement indication comprises at least one selected from the group consisting of a physical contact or separation, a physical displacement, an electrical signal, a magnetic signal, and a biometric characteristic.

6. The method of claim 1, further comprising:
    receiving authorization data; and
    verifying the authentication data, the granting of the permission being at least in response to verification of the authorization data.

7. The method of claim 6, wherein the authorization data comprises at least one selected from the group consisting of accelerometer data, a data point, a string of data, an array of data, a data file, a sequence of data, a biometric characteristic, a device identifier, a passcode, an authorization token, a user identifier, a geographic location, a temporal value, and a physical device.

8. The method of claim 1, wherein the permission comprises at least one selected from the group consisting of accelerometer data, a data point, a string of data, an array of data, a data file, a sequence of data, a biometric characteristic, a device identifier, a passcode, an authorization token, a user identifier, a geographic location, a temporal value, and a physical device.

9. The method of claim 1, wherein the at least one action includes disarming an alarm monitoring system; and
    the revoking of the permission causing activation of the alarm monitoring system.

10. A wearable device configured for persistent authentication, the wearable device comprising:
    an enablement component, configured to:
        receive an enablement indication in response to a first physical change to the wearable device; and
        receive a disablement indication in response to a second physical change to the wearable device; and
    processing circuitry having a processor and a memory, the memory storing programmatic code that, when executed by the processor, configures the processor to:
        activate the wearable device in response to the enablement indication;
        grant a permission at least in response to the activation of the wearable device, the permission being configured to provide authorization for performing at least one action;
        utilize the permission;
        deactivate the wearable device in response to the disablement indication, the disablement indication comprising at least one selected from the group consisting of a physical contact or separation, a physical displacement, an electrical signal, a magnetic signal, and absence of a biometric characteristic; and
        revoke the permission in response to the deactivation of the wearable device.

11. The wearable device of claim 10, wherein the wearable device further comprises at least one selected from the group consisting of a bracelet, an anklet, a necklace or other piece of jewelry, a wrist watch, a wearable smart device, eyeglasses, sunglasses, an armband, a waistband, and a belt or other clothing item with a latch, clasp, clip, lock, pin, buckle, fastener, proximity detector or biometric sensor.

12. The wearable device of claim 10, wherein the enablement component comprises at least one selected from the group consisting of a physical connector, an electrical circuit, a magnetic field, a proximity detector, and a biometric sensor.

13. The wearable device of claim 10, wherein the communication component comprises at least one selected from the group consisting of a data bus, a wireless communicator, a magnetic storage interface, an electronic storage interface, and a cavity, compartment, mount point or other physical interface.

14. The wearable device of claim 10, wherein the communication component is further configured to:

receive the permission from a permission source; and
transmit the permission to the authentication requestor.

15. The wearable device of claim 10, wherein the processor is further configured to store the permission.

16. The wearable device of claim 10, wherein the authorization interface comprises at least one selected from the group consisting of a data storage device, a keypad, a touchscreen, a biometric reader, an electronic signal, a wireless communicator, a mechanical actuator, and a physical device.

17. The wearable device of claim 10, further comprising;
 a communication component configured to receive authorization data from an authorization interface; and
 the processing circuitry being further configured to verify the authentication data, the granting of the permission being at least in response to verification of the authorization data.

18. The wearable device of claim 17, wherein the authorization data comprises at least one selected from the group consisting of accelerometer data, a data point, a string of data, an array of data, a data file, a sequence of data, a biometric characteristic, a device identifier, a passcode, an authorization token, a user identifier, a geographic location, a temporal value, and a physical device.

19. The wearable device of claim 10, wherein the at least one action includes disarming an alarm monitoring system; and
 the revoking of the permission causes activation of the alarm monitoring system.

\* \* \* \* \*